US011542376B2

(12) United States Patent
Bai et al.

(10) Patent No.: US 11,542,376 B2
(45) Date of Patent: Jan. 3, 2023

(54) AQUEOUS POLYURETHANE DISPERSION

(71) Applicants: Rohm and Haas Company, Collegeville, PA (US); Dow Global Technologies LLC, Midland, MI (US)

(72) Inventors: Chenyan Bai, Shanghai (CN); Zhaohui Qu, Shanghai (CN); Hong Liang Zhang, Shanghai (CN); Debkumar Bhattacharjee, Blue Bell, PA (US)

(73) Assignees: ROHM AND HAAS COMPANY, Collegeville, PA (US); DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/016,707

(22) Filed: Jun. 25, 2018

(65) Prior Publication Data
US 2018/0305508 A1   Oct. 25, 2018

Related U.S. Application Data

(62) Division of application No. 15/165,514, filed as application No. PCT/CN2013/088390 on Dec. 3, 2013, now abandoned.

(51) Int. Cl.
| C08J 5/12 | (2006.01) |
| C08G 18/48 | (2006.01) |
| C08G 18/66 | (2006.01) |
| C08G 18/76 | (2006.01) |
| C08G 18/12 | (2006.01) |
| C08G 18/32 | (2006.01) |
| C08G 18/40 | (2006.01) |
| C08G 18/42 | (2006.01) |
| C09J 175/08 | (2006.01) |
| B32B 37/12 | (2006.01) |
| B32B 37/14 | (2006.01) |
| C08L 75/08 | (2006.01) |
| C09J 5/02 | (2006.01) |

(52) U.S. Cl.
CPC ............ *C08J 5/127* (2013.01); *B32B 37/12* (2013.01); *B32B 37/14* (2013.01); *C08G 18/12* (2013.01); *C08G 18/3206* (2013.01); *C08G 18/4018* (2013.01); *C08G 18/4236* (2013.01); *C08G 18/4247* (2013.01); *C08G 18/4277* (2013.01); *C08G 18/4833* (2013.01); *C08G 18/4862* (2013.01); *C08G 18/6607* (2013.01); *C08G 18/7657* (2013.01); *C08G 18/7671* (2013.01); *C08L 75/08* (2013.01); *C09J 5/02* (2013.01); *C09J 175/08* (2013.01); *C08G 2170/80* (2013.01); *C08J 2375/08* (2013.01); *C08L 2201/54* (2013.01)

(58) Field of Classification Search
CPC ......... B32B 37/12; B32B 37/14; C08G 18/12; C08G 18/3206; C08G 18/4018; C08G 18/4236; C08G 18/4833; C08G 18/4277; C08G 18/4862; C08G 18/4247; C08G 18/6607; C08G 18/7671; C08G 18/7657; C08G 2710/80; C08J 5/127; C08J 2375/08; C08L 75/08; C08L 2201/54; C09J 5/02; C09J 175/08

See application file for complete search history.

(56) References Cited

U.S. PATENT DOCUMENTS

| 4,238,378 A * | 12/1980 | Markusch .......... C08G 18/0809 524/591 |
| 4,269,748 A | 5/1981 | Nachtkamp et al. |
| 7,928,161 B2 | 4/2011 | Bhattacharjee et al. |
| 2001/0040008 A1 | 11/2001 | Bauriedel et al. |
| 2002/0028877 A1 | 3/2002 | Parks et al. |
| 2003/0083428 A1 | 5/2003 | Bauriedel et al. |
| 2007/0112165 A1 | 5/2007 | Chen et al. |
| 2007/0264462 A1 | 11/2007 | Covelli et al. |
| 2008/0214729 A1 | 9/2008 | Buter et al. |
| 2009/0215954 A1 | 8/2009 | Gertzmann et al. |
| 2010/0266853 A1 | 10/2010 | Kraus et al. |
| 2011/0082236 A1 | 4/2011 | Erdem et al. |
| 2012/0016075 A1 | 1/2012 | Uchida |

(Continued)

FOREIGN PATENT DOCUMENTS

| CN | 101638472 A | 2/2010 |
| CN | 102690404 A | 9/2012 |
| JP | H04325510 A | 11/1992 |
| JP | H11323300 A | 11/1999 |
| JP | 2001302714 A | 10/2001 |
| JP | 2005255860 A | 9/2005 |

(Continued)

OTHER PUBLICATIONS

European Application No. 13898558.5 Extended Search Report dated Apr. 3, 2017.

(Continued)

*Primary Examiner* — Patrick D Niland

(57) ABSTRACT

Provided is an aqueous composition comprising dispersed particles that comprise a polyurethane, wherein said polyurethane is a reaction product of a group of reactants (GR1), wherein GR1 comprises one or more aromatic polyisocyanates and, a polyol component, wherein said polyol component comprises
(a) 50% to 99% by weight, based on the weight of said polyol component, one or more polyester polyols,
(b) 0.1% to 10% by weight, based on the weight of said polyol component, one or more diols having a hydrophilic side chain, and
(c) 0.9% to 40% by weight, based on the weight of said polyol component, one or more polyols different from (a) and (b).

Also provided is a method of bonding a metal foil to a polymer film using such an aqueous composition.

4 Claims, No Drawings

(56) References Cited

U.S. PATENT DOCUMENTS

| | | |
|---|---|---|
| 2012/0225302 A1 | 9/2012 | Buchner et al. |
| 2013/0149510 A1 | 6/2013 | Meyer et al. |
| 2013/0203936 A1 | 8/2013 | Fujita et al. |
| 2013/0316098 A1 | 11/2013 | Lubnin et al. |

FOREIGN PATENT DOCUMENTS

| | | |
|---|---|---|
| JP | 2008255196 A | 10/2008 |
| JP | 2010280842 A | 12/2010 |
| JP | 2012077255 A | 4/2012 |
| WO | 2011045416 A1 | 4/2011 |

OTHER PUBLICATIONS

PCT/CN2013/088390, International Search Report and Written Opinion dated Sep. 11, 2017.
PCT/CN2013/088390, International Preliminary Report on Patentability dated Jun. 16, 2016.

\* cited by examiner

AQUEOUS POLYURETHANE DISPERSION

One important use of adhesive compositions is to bond the layers of a laminate. For example, it is often desired to provide an adhesive composition that can bond a metal foil to a polymer film. It is desirable for reasons of safety and environmental protection that adhesive compositions be waterborne. A desirable method of using a waterborne adhesive composition to bond the layers of a laminate is dry bond lamination, which is a method in which a layer of the waterborne adhesive composition is applied to a primary substrate, then the waterborne adhesive composition is dried or allowed to dry, then a secondary substrate is brought into contact with the dried adhesive composition.

It is desired that waterborne adhesive compositions be in the form of organic particles dispersed in a continuous aqueous medium. It is also desired that waterborne adhesive compositions are stable; for example, they should not show signs of settling or phase separation upon storage. It is further desired that the waterborne adhesive composition provide good adhesion to substrates, especially when bonding an aluminum foil to a polymer film.

U.S. Pat. No. 7,928,161 describes aqueous polyurethane dispersions, including polyurethane dispersions made from polyester polyol, poly(EO), and aliphatic isocyanate. In contrast to U.S. Pat. No. 7,928,161, it is desired to provide aqueous polyurethane dispersions in which the polyurethane is made using aromatic isocyanates. Aromatic isocyanates are, in general, significantly less expensive (almost by a factor of three) than typical aliphatic or cycloaliphatic diisocyanates.

The following is a statement of the invention.

A first aspect of the present invention is an aqueous composition comprising one or more anionic surfactants and further comprising dispersed particles that comprise a polyurethane, wherein said polyurethane is a reaction product of a group of reactants (GR1), wherein GR1 comprises one or more aromatic polyisocyanates and, a polyol component, wherein said polyol component comprises
  (a) 50% to 99% by weight, based on the weight of said polyol component, one or more polyester polyols,
  (b) 0.1% to 10% by weight, based on the weight of said polyol component, one or more diols having a hydrophilic side chain, and
  (c) 0.9% to 40% by weight, based on the weight of said polyol component, one or more polyols different from (a) and (b).

A second aspect of the present invention is a method of bonding a metal foil to a polymeric film comprising the steps of
  (A) applying a layer of the composition of the first aspect to a surface of said metal foil,
  (B) drying said layer of said adhesive composition to produce a layer of dried adhesive, and
  (C) after said drying, bringing a surface of a polymeric film into contact with said layer of said dried adhesive composition.

A third aspect of the present invention is an aqueous composition comprising dispersed particles that comprise a polyurethane, wherein said polyurethane is a reaction product of a group of reactants (GR1), wherein GR1 comprises one or more aromatic polyisocyanates and, a polyol component, wherein said polyol component comprises
  (a) 50% to 99% by weight, based on the weight of said polyol component, one or more polyester polyols,
  (b) 0.1% to 10% by weight, based on the weight of said polyol component, one or more diols having a hydrophilic side chain, wherein said hydrophilic side chain comprises one or more anionic group; and
  (c) 0.9% to 40% by weight, based on the weight of said polyol component, one or more polyols different from (a) and (b).

The following is a detailed description of the invention.

As used herein, the following terms have the designated definitions, unless the context clearly indicates otherwise.

A metal foil is a piece of metal having length and width of at least 1 cm each and having thickness of 0.5 mm or less. A polymeric film is a piece of material made of an organic polymer having length and width of at least 1 cm each and having thickness of 0.5 mm or less.

A composition is said herein to be waterborne if the composition is liquid at 25° C. and contains 30% or more water by weight based on the weight of the composition. A waterborne composition contains a continuous fluid medium in which discreet droplets or particles may optionally be suspended. The continuous fluid medium contains water in the amount, by weight based on the weight of the continuous fluid medium, of 50% or higher. The continuous fluid medium is herein called an aqueous medium.

Compounds other than water that are contained in a waterborne composition are said herein to be distributed through the aqueous medium. Such compounds may be dissolved or dispersed or a combination thereof. Dispersed compounds exist as discreet droplets or particles; such particles may contain two or more substances. Dispersed droplets or particles have weight-average diameter of 5 nm or more. Compounds that are dissolved in the aqueous medium are distributed as individual molecules.

An isocyanate is a compound that contains one or more pendant isocyanate group —NCO. An isocyanate that contains more than one isocyanate group per molecule is a polyisocyanate. An isocyanate that contains exactly two isocyanate groups is a diisocyanate. A monomeric diisocyanate has the structure OCN—$R^1$—NCO, where —$R^1$— is a divalent organic group having no isocyanate groups, having no urethane linkages, and having molecular weight of less than 500. An aromatic polyisocyanate is a polyisocyanate that contains one or more —NCO groups directly bonded to aromatic rings per molecule.

A polyol is a compound having two or more —OH groups per molecule. A diol has exactly two —OH groups per molecule. A difunctional polyol is a diol. A polyamine is a compound having two or more amine groups per molecule; the amine groups may be primary, secondary, or a mixture thereof. A diamine has exactly two amine groups per molecule. A difunctional polyamine is a diamine.

An ester is a compound that contains an ester linkage, which has the structure

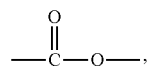

in which both of the open bonds are connected to carbon atoms. A polyester is a compound that contains three or more ester linkages per molecule. An ether is a compound that contains an ether linkage, which has the structure —O—, in which both open bonds are connected carbon atoms. A polyether is a compound that contains three or more ether linkages per molecule. A compound that is both a polyether and a polyol is a polyether polyol. A compound that is both a polyester and a polyol is a polyester polyol. An aliphatic polyester polyol is a polyester polyol that contains no aromatic ring in its molecule. An aromatic polyester polyol is a polyester polyol that contains one or more aromatic ring in its molecule.

A urethane is a compound that contains a urethane linkage, which has the structure

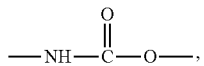

in which both of the open bonds are connected to carbon atoms. A polyurethane is a compound that contains three or more urethane linkages per molecule.

A urea linkage is the structure

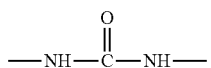

in which both of the open bonds are connected to carbon atoms.

The "solids" of an aqueous composition is the amount of non-volatile material contained in the composition. The category "non-volatile material" includes substances that are solid when in pure form at 25° C. and substances with boiling point of 150° C. or higher. Also included in the category "non-volatile material" are compounds that react with one or more other compounds during the process of drying the aqueous composition to form a product that does not evaporate during the process of drying the aqueous composition.

An organic solvent is a compound that is not water; that is a liquid at 25° C.; and that has boiling point of below 300° C.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The adhesive composition of the present invention comprises an aqueous medium. Preferably, the amount of water in the aqueous medium, by weight based on the weight of the aqueous medium, is 70% or more; or 80% or more; or 90% or more.

The composition of the present invention contains a polyurethane that is the reaction product of a group of reactants that is herein called "GR1."

GR1 includes one or more aromatic polyisocyanates. Preferred polyisocyanates are monomeric diisocyanates having molecular weight of 300 or less; more preferably 275 or less. Preferred are one or more isomers of MDI; more preferred are 4,4'-MDI and mixtures of 4,4'-MDI with other isomers of MDI; more preferred is a mixture of 4,4'-MDI with 2,4'-MDI. Among mixtures of 4,4'-MDI with 2,4'-MDI, preferably the ratio of 4,4'-MDI to 2,4'-MDI is 0.75:1 or greater; more preferably 1:1 or greater; more preferably 1.01:1 or greater; more preferably 1.1:1 or greater. Among mixtures of 4,4'-MDI with 2,4'-MDI, preferably the ratio of 4,4'-MDI to 2,4'-MDI is 3:1 or less; more preferably 2:1 or less; more preferably 1.5:1 or less.

Preferably, the total amount of aromatic polyisocyanates is, by weight based on the total weight of GR1, 8% or more; more preferably 12% or more. Preferably, the total amount of aromatic polyisocyanates is, by weight based on the total weight of GR1, 50% or less; more preferably 40% or less; more preferably 30% or less.

Preferably, the one or more polyisocyanates contain little or no blocked polyisocyanate. A blocked polyisocyanate is a reaction product of a polyisocyanate with a blocking compound; the blocked polyisocyanate does not react at room temperature (i.e., approximately 25° C.) with polyols or other isocyanate-reactive compounds. However, at elevated temperature, the blocked polyisocyanate reacts with polyols or other isocyanate-reactive compounds as an ordinary polyisocyanate would react. Preferably, GR1 either contains no blocked polyisocyanates or else contains blocked polyisocyanates in an amount that is 0.1% or less by weight based on the weight of all polyisocyanates in GR1.

GR1 also includes a polyol component. Preferably, the amount of polyol component in GR1 is, by weight based on the total weight of GR1, 50% or more; more preferably 60% or more; more preferably 70% or more. Preferably, the amount of polyol component in GR1 is, by weight based on the total weight of GR1, 95% or less; more preferably 90% or less.

Preferably, no polyol is present in GR1 other than polyols contained in the polyol component.

The polyol component contains one or more polyester polyols (a). Among polyester polyols, preferred are those that are difunctional. Preferred polyester polyols (a) have weight-average molecular weight (Mw) of 750 or higher; more preferably 1,500 or higher. Preferred polyester polyols (a) have number-average molecular weight of 6,000 or lower; more preferably 4,000 or lower; more preferably 3,500 or lower. Preferably, the total amount of polyester polyols (a) in the polyol component, by weight based on the weight of the polyol component, is 50% or more; more preferably 60% or more; more preferably 70% or more; more preferably 75% or more. Preferably, the total amount of polyester polyols (a) in the polyol component, by weight based on the weight of the polyol component, is 99% or less; more preferably 95% or less. Preferably, polyester polyol (a) contains one or more aliphatic polyester polyols. More preferably, polyester polyol (a) contains one or more aliphatic polyester polyols and contains no aromatic polyester polyols.

The polyol component contains one or more diol having a hydrophilic side chain (b). A side chain is a chemical group that contains a linear chain of 3 or more atoms other than hydrogen; the side chain contains no hydroxyl groups or other groups that react with isocyanate under the conditions of the formation of the polyurethane of the present invention. Preferably, a diol having a hydrophilic side chain (b) contains a linear chain of atoms that connects the two hydroxyl groups (the "main chain"), and an atom of the side chain is attached by a single bond to an atom in the main chain. A side chain is considered hydrophilic if a molecule were to be made by breaking the bond between the side chain and the main chain, and then capping the side chain fragment with a hydrogen atom, and that resulting molecule had solubility in water at 25° C. of 5% or more by weight based on the weight of the water.

Preferred side chains contain bonded units selected from ethylene oxide, propylene oxide, butylene oxide, and combinations thereof. The units may be arranged in a line or in a branched structure or in a mixture thereof. The units may be arranged randomly or in blocks or in a mixture thereof. Preferably, the number of ethylene oxide units is 10 or more; more preferably 15 or more. Preferably, the number of ethylene oxide units is 30 or fewer; more preferably 25 or fewer. Preferably, the number of propylene oxide units is 20 or fewer; more preferably 10 or fewer; more preferably 5 or fewer; more preferably zero. Preferably, the number of butylene oxide units is 10 or fewer; more preferably 5 or fewer; more preferably 2 or fewer; more preferably zero.

Also contemplated are polyols having a hydrophilic side chain (b) in which the side chain contains an anionic group. An anionic group is a group that when exposed to water at some range of pH values within the range of 5 to 10, exists in the anion form. Examples of polyols having a side chain that contains an anionic group are 1,2-dihydroxy-3-propanesulfonic acid salt (DHPA) and dimethylolpropionic acid (DMPA).

Preferably the total amount of diols having a hydrophilic side chain (b) in the polyol component is, by weight based on the weight of the polyol component, 0.1% or more; more preferably 0.2% or more; more preferably 0.4% or more. Preferably the total amount of diols having a hydrophilic side chain in the polyol component is, by weight based on the weight of the polyol component, 10% or less; more preferably 5% or less.

The polyol component contains 0.9% to 25% by weight, based on the weight of the polyol component, one or more polyols (c), which are different from polyester polyols (a) and diols having a hydrophilic side chain (b).

Polyols (c) preferably contain one or more polyethylene glycol. A polyethylene glycol has the structure H—[—O—CH$_2$—CH$_2$—]$_n$—O—H. The parameter n is 3 or higher. Preferably, the weight-average molecular weight of polyethylene glycol is 500 or higher; more preferably 750 or higher. Preferably, the weight-average molecular weight is 3,000 or lower; more preferably 2,000 or lower; more preferably 1,500 or lower. Preferably, the total amount of polyethylene glycols in the polyol component, by weight based on the weight of the polyol component, is 0.9% or more; more preferably 2% or more; more preferably 4% or more. Preferably, the total amount of polyethylene glycols in the polyol component, by weight based on the weight of the polyol component, is 40% or less; more preferably 20% or less; more preferably 15% or less; more preferably 12% or less.

Polyols (c) preferably additionally contain one or more monomeric diols. A monomeric diol is a diol that has molecular weight of less than 500. Preferred monomeric diols have molecular weight of less than 400; more preferably less than 300; more preferably less than 200. Preferred monomeric diols have either the structure HO—R$^1$—OH or the structure OH—R$^2$—O—R$^3$—OH, where each of R$^1$, R$^2$, and R$^3$ is independently a linear or branched alkyl group. More preferred monomeric diols have the structure OH—R$^2$—O—R$^3$—OH, Preferably, R$^2$ and R$^3$ are identical to each other. Preferably, R$^2$ has 3 carbon atoms.

Preferably, the total amount of monomeric diols in the polyol component is, by weight based on the weight of the polyol component, 0.5% or more; more preferably 1% or more; more preferably 2% or more. Preferably, the total amount of monomeric diols in the polyol component is, by weight based on the weight of the polyol component, 10% or less; more preferably 5% or less.

The sum of the amounts of (a), (b), (c), and (d), by weight based on the weight of the polyol component, is 100%.

It is useful to contemplate the category of "other" polyether polyols. This category contains any polyether polyol that does not fall into either the category of polyethylene glycols described herein above or the category of diols having a hydrophilic side chain. Preferably, the amount of other polyether polyols in the polyol component is 20% or less by weight based on the weight of the polyol component; more preferably 10% or less by weight; more preferably 5% or less; more preferably zero.

Preferably, the polyol component contains little or no fatty polyol. A fatty polyol is a polyol the molecule of which contains a linear hydrocarbon chain of 8 or more carbon atoms. Preferably, the polyol component contains either contains no fatty polyol or else contains fatty polyol in an amount that is 0.1% or less by weight based on the weight of the polyol component.

GR1 preferably additionally comprises one or more polyamine. Preferred polyamines are diamines. Preferred polyamines are polyamines in which every amine group is a primary amine. Preferred polyamines are alkyl compounds having two or more primary amine groups attached and no other substituents. Preferred polyamines have molecular weight of 500 or less; more preferably 200 or less; more preferably 100 or less. Preferably the amount of polyamine is, by weight based on the total weight of the GR1, 0.1% or more; more preferably 0.2% or more; more preferably 0.3% or more. Preferably the amount of polyamine is, by weight based on the total weight of GR1, 5% or less; more preferably 2.5% or less; more preferably 1.5% or less.

In some embodiments GR1 contains little or no carboxyl-functional compound. Preferably, GR1 either contain no carboxyl-functional compound or else contain carboxyl-functional compound in an amount of 0.1% or less by weight based on the total weight of GR1.

It is useful to characterize the polyurethane content of the aqueous composition, which is the weight of the polyurethane, divided by the total weight of the aqueous composition, expressed as a percentage. Preferably, the polyurethane content of the aqueous composition is 10% or higher; more preferably 20% or higher; more preferably 25% or higher. Preferably, the polyurethane content of the aqueous composition is 60% or lower; more preferably 50% or lower; more preferably 45% or lower.

The aqueous composition of the present invention preferably contains one or more anionic surfactants. Anionic surfactants are compounds the molecules of which have a hydrophobic portion and a portion that is anionic. The molecules of preferred anionic surfactants contain a hydrocarbon group that has 6 or more carbon atoms; more preferably 8 or more carbon atoms; more preferably 10 or more carbon atoms. Hydrocarbon groups may be linear, branched, cyclic aliphatic, aromatic, or a combination thereof; preferred is a linear alkyl group attached to an aromatic ring. Preferred anionic groups are acid and salt forms of carboxyl groups, sulfate groups, and sulfonate groups. Preferred anionic groups are sulfonate groups. Preferred form of anionic groups is sodium salt.

Preferably, the amount of anionic surfactant in the aqueous composition is, by weight based on the solids weight of the aqueous composition, 0.5% or more; more preferably 0.8% or more; more preferably 2% or more. Preferably, the amount of anionic surfactant in the aqueous composition is, by weight based on the solids weight of the aqueous composition, 10% or less; more preferably 8% or less; more preferably 5% or less.

Also contemplated are embodiments in which the polyol having a hydrophilic side chain (b) contains one or more polyols having a side chain that contains an anionic group. It is contemplated that when such a side chain is present, the use of anionic surfactant is optional.

The presence of organic solvent in the present invention is optional. When organic solvent is present, the amount of organic solvent in the aqueous composition of the present invention is preferably either zero or 4% or less; more preferably either zero or 2% or less; more preferably either zero or 1% or less; more preferably either zero or 0.5% or less; more preferably zero.

Preferably the solids content of the aqueous composition of the present invention is 20% or higher; more preferably 30% or higher. Preferably the solids content of the aqueous composition of the present invention is 60% or lower; more preferably 50% or lower.

Preferably the volume-average particle size of the dispersed particles of polyurethane is 50 nm or larger; more preferably 100 nm or larger; more preferably 150 nm. Preferably the volume-average particle size of the dispersed particles of polyurethane is 500 nm or smaller; more preferably 350 nm or smaller; more preferably 250 nm or smaller.

The composition of the present invention may be made by any method. A preferred method is as follows.

The one or more polyisocyanates are mixed together with the polyol component and heated to make a polyurethane prepolymer. Preferably, the polyurethane prepolymer is isocyanate-functional. The polyurethane prepolymer is then preferably mixed with organic solvent. When organic solvent is used, the amount of solvent is preferably, by weight based on the solids weight of the composition, is 50% or less; more preferably 30% or less. The resulting mixture is then mixed with an aqueous solution of an anionic surfactant under high-speed agitation. Then additional water is added under high-speed agitation, and a dispersion forms in which the continuous phase is aqueous and the dispersed particles contain polyurethane prepolymer. A polyamine, when it is used, is then added slowly under high-speed agitation. When polyamine reacts with isocyanate groups on the polyurethane prepolymer, the resulting polymer is referred to as a polyurea-polyurethane. When organic solvent is used in making the polyurethane, the organic solvent is preferably removed from the composition. Preferably, the organic solvent has boiling point of less than 100° C.; then the organic solvent is preferably removed from the composition by distillation.

The aqueous composition of the present invention may be used for any purpose. A preferred purpose is use as an adhesive. To use the composition as an adhesive, prior to applying the composition to a substrate, an isocyanate crosslinker is added to the composition.

An isocyanate crosslinker is a polyisocyanate that has two or more isocyanate groups. Preferred isocyanate crosslinkers have three or more isocyanate groups per molecule. Preferred isocyanate crosslinkers are trimers of monomeric diisocyanates. When the monomeric diisocyanate has the structure OCN—$R^4$—NCO, where —$R^4$— is a divalent organic group, the trimer has the structure

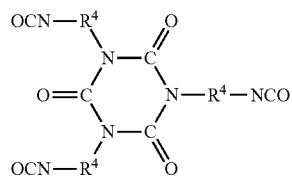

Preferred monomeric diisocyanates for use in making trimers are aliphatic diisocyanates. More preferred are 1,6-hexamethylene diisocyanate (HDI), 1-isocyanato-3-isocyanatomethyl-3,5,5-trimethyl-cyclohexane (IPDI), 4,4'-diisocyanato dicyclohexylmethane (H12MDI), and di-isocyanatomethyl-cyclohexane (ADI). More preferred are HDI and ADI; most preferred is HDI.

Preferably, the isocyante crosslinker is water soluble or water dispersible, When such an isocyanate crosslinker is added to the composition, it becomes dissolved or dispersed in the aqueous medium. A preferred way to add isocyanate crosslinker to the composition is to add an isocyanate crosslinker that contains a hydrophilically modified version of one or more trimer of a monomeric diisocyanate. Hydrophilic modification is a process in which one or more of the isocyanate groups on the trimer is reacted with a compound to attach a hydrophilic group to the residue of the isocyanate group. Preferred hydrophilic groups are anionic groups and groups containing residues of ethylene oxide.

Preferably, the amount of isocyanate crosslinker, by weight based on the total weight of the composition, is 0.5% or more; more preferably 1% or more. Preferably, the amount of isocyanate crosslinker, by weight based on the total weight of the composition, is 8% or less; more preferably 4% or less.

A particularly preferred use for the composition of the present invention is as a laminating adhesive. To use the composition as a laminating adhesive, the composition is preferably mixed with one or more isocyanate crosslinker to form a waterborne adhesive composition. The use as a laminating adhesive is described as follows.

A layer of waterborne adhesive composition is preferably applied to a surface of a metal foil. Preferably, the metal foil is an aluminum foil. Preferably, the thickness of the metal foil is 1 µm or more; more preferably 3 µm or more. Preferably, the thickness of the metal foil is 25 µm or less; more preferably 15 µm or less.

Preferably the layer of waterborne adhesive composition is dried or allowed to dry to form a layer of dried adhesive composition. Drying may be accomplished by any method, including, for example, one or more of passage of time, applying heat, and exposing to moving air. The layer of adhesive composition is considered to be dried when the amount of water remaining in the layer of adhesive composition is 10% or less by weight, based on the weight of water that was applied as part of the waterborne adhesive composition.

The dried layer of adhesive composition is preferably brought into contact with the surface of a polymer film. Preferred polymers for the polymer film are organic polymers; more preferred are polyolefins, polyolefin copolymers, polycarbonates, polyesters, and polyamides. Polyolefins are homopolymers and copolymers of olefin monomers, which are hydrocarbon molecules containing one or more carbon-carbon double bond. Polyolefin copolymers are copolymers of one or more olefin monomer with one or more vinyl acetate, acrylate monomers, and methacrylate monomers. Preferred polymers are polyethylene, polyethylene terephthalate, and nylon; more preferred is polyethylene. Preferably, the thickness of the polymer film is 1 µm or more; more preferably 3 µm or more. Preferably, the thickness of the polymer film is 200 µm or less; more preferably 100 µm or less.

After the polymer film comes into contact with the layer of dried adhesive composition, the composite article thus formed is known as a laminate. The laminate is preferably subjected to mechanical force to press the polymer film and the metal foil towards each other. Such mechanical force is preferably applied by passing the composite article between rollers.

In some embodiments of the present invention, the composite article made of the metal foil, the layer of adhesive composition, and the polymer film is part of a larger composite article that contains further layers. The further layers may contain one or more polymer films, one or more layers of adhesive compositions, and one or more metal foils; any polymer films, adhesive compositions, or metal foils present in the further layers may be the identical to or different from each other and from the polymer film, adhesive composition, and metal foil present in the above-described composite article.

For example, in some embodiments, a larger composite article is made as follows. A first layer of adhesive composition is applied to a polyethylene terephthalate film, and that first adhesive composition is brought into contact with one surface of a metal foil. Then, on the opposite surface of the metal foil, a second layer of adhesive composition is applied, and that second adhesive composition is brought into contact with a surface of a polymer film of polyethylene. Preferably, among such embodiments, both the first layer of adhesive composition and the second layer of adhesive composition are layers of the waterborne adhesive composition of the present invention, and preferably each layer is dried prior to contact with the next substrate.

The following are examples of the present invention.
The following materials were used:

| Component | Grade name | Characteristic | Supplier |
|---|---|---|---|
| Polyester polyol | Bester ™ 121, Bester ™ 127, | Mw = 2000, | Dow |
|  | Capa ™ 2302 | Mw = 3000 | Perstorp |
| isocyanate | Isonate ™ 50 OP | 2,4-MDI/4,4'-MDI = 45/55 | Dow |
| Polyether polyol | Voranol V9287A | Mw = 2000 | Dow |
| Polyether polyol | PTMEG | Mw = 2000 | Invista |
| Methoxy polyethylene glycol | CARBOWAX ™ Methoxy polyethylene glycol (MPEG 1000) | Mw = 1000, Polyethylene glycol monomethyl ether purity >=99.0% | Dow |
| Polyethylene glycol | CARBOWAX ™ polyethylene Glycol 1000 (PEG 1000) | Mw = 1000, Polyethylene glycol, purity >=99.0% | Dow |
| Diol with hydrophilic side chain | Ymer N 120 | Mw = 1000, EO as side chain | Perstorp |
| monomeric diol | Dipropylene glycol | Chemically pure grade | TCI |
| anionic surfactant | Rhodacal ™ DS-4 | Sodium dodecylbenzene sulfonate(23% solid) | Rhodia |
| polyamine | 1,2-propane diamine | Chemically pure grade | TCI |
| water | Deionized water |  |  |
| crosslinker | CR3A | HDI trimer | Dow |

EXAMPLE 1

Added Mg Isonate™ 50 OP to a mixture of 121 g Bester™ 121, 14.4 g PEG1000, 4.8 g DPG, 19 g Bester™ 127 and 1 g Ymer™ N 120, then reacted at 65-90° C. for 4-5 h until reached the theoretical NCO content, then added 50 g acetone. Then transfered the prepolymer into a plastic jar, and added 26.8 g Rhodacal™ DS-4 into the plastic jar under high speed (2000-3000 rpm) stirring for 1-3 minutes, then added 300 g cold DI water (5° C.) under high speed stirring to make sure a homogeneous oil-in-water dispersion was achieved, then added 9.2 g PDA water solution (20%) into the dispersion slowly, then held stirring at 1000-1500 rpm for 15-30 minutes. Then acetone was removed by distillation under 120 mbar at 40° C. An aqueous dispersion with solid content of 40%, pH of 6.5, and an average particle size of 200 nm is formed. The dispersion proved to be stable and no sediment was observed after conditioning at room temperature (23° C.) for two months.

EXAMPLE 2

Added 27.9 g Isonate™ 50 OP to the mixture of 107.2 g Capa™ 2302, 12 g PEG1000, 3.8 g DPG and 5 g Ymer™ N 120, then reacted at 65-90° C. for 4-5 h until reached the theoretical NCO content. Then transferred the prepolymer into a plastic jar, and added 19.8 g Rhodacal™ DS-4 into plastic jar under high speed (2000-3000 rpm) stirring for 1-3 minutes, then added 330 g cold DI water (5° C.) under high speed to make sure the homogeneous oil-in-water dispersion was achieved, then added 3.4 g PDA water solution (20%) into the dispersion slowly, then held stirring at 1000-1500 rpm for 15-30 minutes. An aqueous dispersion with solid content of 31.6%, pH of 6.4, and a volume-average particle size of 175 nm (measured by laser light scattering) was formed. The dispersion proved to be stable and no sediment was observed after conditioning at room temperature (23° C.) for two months.

EXAMPLE 3

Added 45.6 g Isonate™ 50 OP to the mixture of 142.2 g Bester™ 121, 8.2 g PEG1000, 5.1 g DPG and 4.2 g Ymer™ N 120, then reacted at 65-90° C. for 4-5 h until reached the theoretical NCO content, then charged 80 g acetone. Then transferred the prepolymer into a plastic jar, and added 25.4 g Rhodacal™ DS-4 into plastic jar under high speed (2000-3000 rpm) stirring for 1-3 minutes, then added 270 g cold DI water (5° C.) under high speed stirring to make sure the homogeneous oil-in-water dispersion was achieved, then added 6.7 g PDA water solution (20%) into the dispersion slowly, then held stirring at 1000-1500 rpm for 15-30 minutes. The acetone was removed by distillation under 120 mbar at 40° C. An aqueous dispersion with solid content of 41.9%, pH of 6.1, and an average particle size of 175 nm was formed. The dispersion proved to be stable and no sediment was observed after conditioning at room temperature (23° C.) for two months.

EXAMPLE 4 (COMPARATIVE EXAMPLE)

Added 50 g Isonate™ 50 OP to the mixture of 136.4 g Bester™ 121, 8 g PEG1000 and 5.6 g DPG, then reacted at 65-90° C. for 4-5 h until reached the theoretical NCO content, then charged 60 g acetone. Then transferred the prepolymer into a plastic jar, and added 25.4 g Rhodacal™ DS-4 into plastic jar under high speed (2000-3000 rpm) stirring for 1-3 minutes, then added 270 g cold DI water (5° C.) into plastic jar under high speed stirring, but it failed to invert from water-in-oil to oil-in-water phase; no dispersion was obtained.

EXAMPLE 5(COMPARATIVE EXAMPLE)

Add 35 g Isonate™ 50 OP to the mixture of 200 g Capa™ 2302, 15 g PEG1000, then react at 65-90° C. for 4-5 h until reached the theoretical NCO content. Then transferred the prepolymer into a plastic jar, and add 31.7 g Rhodacal™ DS-4 into plastic jar under high speed (2000-3000 rpm) stirring for 1-3 minutes, then added 360 g cold DI water (5° C.) into plastic jar under high speed stirring to make sure the homogeneous oil-in-water dispersion was achieved, then added 6.5 g PDA water solution (20%) into the dispersion slowly, then held stirring at 1000-1500 rpm for 15-30 minutes. The dispersion had settlement after 4 h at room temperature.

EXAMPLE 6(COMPARATIVE EXAMPLE)—POLYETHER BASED MDI PUD

Added 44.7 g Isonate™ 50 OP to the mixture of 102.5 g Voranol™ V 9287A, 89.7 g PTMEG, 6.2 g PEG1000 and 5.1 g MPEG1000, then reacted at 65-90° C. for 4-5 h until reached the theoretical NCO content. Then transferred the prepolymer into a plastic jar, and added 31.6 g Rhodacal™ DS-4 into plastic jar under high speed (2000-3000 rpm) stirring for 1-3 minutes, then added 360 g cold DI water (5° C.) into plastic jar under high speed to make sure the homogeneous oil-in-water dispersion was achieved, then added 8.2 g PDA water solution (20%) into the dispersion slowly, then held stirring at 1000-1500 rpm for 15-30 minutes. The dispersion was stable at room temperature (23° C.).

Application Test

The above mentioned polyurethane dispersion (PUD) can be used as adhesive for flexible packaging. Mixed the PUD with 2% of cross-linker CR3A by weight based on total weight of PUD under 1000 rpm stirring for 10 min, then coated on the foil with 2.0-2.3 g/m² coating weight using K101 control coater. The coated samples were placed in an oven to drive off the water in the adhesive. Then hot roll laminator HL-101 was used to laminate the secondary substrate on the primary substrate. The nip temperature was around 66° C. (150° F.) during the whole laminations. The laminated film was conditioned at room temperature for 7 days to conduct T-peel bonding strength test using an Instron™ 5943 machine with 250 mm/min speed. The results are shown below. Bond strength is reported as Newtons per 15 mm width. Higher bond strength means better adhesion.

| | Example No: | | | | | |
|---|---|---|---|---|---|---|
| | 1 | 2 | 3 | 4 | 5 | 6 |
| Bond Strength (N) for foil/PE | 8 | 3.7 | 3.6 | note[1] | note[1] | 1.2 |
| Stable Dispersion? | yes | yes | yes | no | no | yes |

Note
[1] bond strength could not be tested due to instability of dispersion

The invention claimed is:

1. An aqueous composition comprising one or more anionic surfactants and further comprising dispersed particles that comprise a polyurethane, wherein said polyurethane is a reaction product of a group of reactants (GR1), wherein GR1 comprises one or more aromatic polyisocyanates and a polyol component, wherein said polyol component consists of:
    (a) 50% to 99% by weight, based on the weight of said polyol component, one or more polyester polyols,
    (b) 0.1% to 10% by weight, based on the weight of said polyol component, one or more diols having a hydrophilic side chain, wherein the hydrophilic side chain comprises bonded units selected from ethylene oxide, propylene oxide, butylene oxide, and combinations thereof, wherein the hydrophilic side chain contains no hydroxyl groups or other groups that react with isocyanate under conditions of formation of the polyurethane; and
    (c) 0.9% to 40% by weight, based on the weight of said polyol component, one or more polyethylene glycols different from (a) and (b),
    wherein said composition additionally comprises one or more isocyanate crosslinker comprising one or more hydrophilically modified trimers of monomeric diisocyanates.

2. The composition of claim 1, wherein said polyester polyol (a) consists of one or more aliphatic polyester polyols.

3. The composition of claim 1, wherein said GR1 additionally comprises one or more polyamines.

4. A method of bonding a metal foil to a polymeric film comprising the steps of
    (A) applying a layer of an aqueous composition to a surface of said metal foil,
        wherein the aqueous composition comprises one or more anionic surfactants and further comprises dispersed particles that comprise a polyurethane, wherein said polyurethane is a reaction product of a group of reactants (GR1), wherein GR1 comprises one or more aromatic polyisocyanates and a polyol component, wherein said polyol component consists of
    (a) 50% to 99% by weight, based on the weight of said polyol component, one or more polyester polyols,
    (b) 0.1% to 10% by weight, based on the weight of said polyol component, one or more diols having a hydrophilic side chain, wherein the hydrophilic side chain comprises bonded units selected from ethylene oxide, propylene oxide, butylene oxide, and combinations thereof, wherein the hydrophilic side chain contains no hydroxyl groups or other groups that react with isocyanate under conditions of formation of the polyurethane; and
    (c) 0.9% to 40% by weight, based on the weight of said polyol component, one or more polyethylene glycols different from (a) and (b);

wherein said composition additionally comprises one or more isocyanate crosslinker comprising one or more hydrophilically modified trimers of monomeric diisocyanates.
(B) drying said layer of said adhesive composition to produce a layer of dried adhesive, and
(C) after said drying, bringing a surface of a polymeric film into contact with said layer of said dried adhesive composition.

* * * * *